_United States Patent Office_ 3,150,085
Patented Sept. 22, 1964

3,150,085
METHOD OF DRILLING A WELL THROUGH A SUBSURFACE FORMATION EMPLOYING AN OIL-IN-WATER EMULSION DRILLING FLUID
Harvey E. Mallory, Midland, Tex., assignor to Great Western Drilling Company, Midland, Tex., a corporation of Texas
No Drawing. Filed June 14, 1956, Ser. No. 591,288
15 Claims. (Cl. 252—8.5)

This invention relates to improvements in the drilling of wells and is more specifically concerned with the composition, preparation, and use of an impoved drilling fluid.

In drilling wells for oil and gas, and particularly when rotary methods are used, it is customary to circulate a fluid through the well and around the drill bit during the drilling operation. Usually, the drilling fluid is an aqueous suspension of solid colloidal matter such as clay, bentonite, etc., these suspensions being known generally as drilling muds. The normal procedure during drilling is to circulate the mud down through the interior of the drill pipe and then back to the surface through the annulus between the drill pipe and the wall of the hole. The drilling fluid issuing from the well is usually passed over a screen and then through a ditch or trough to a mud pit from which it is recirculated through the drill pipe by suitable pumps.

The functions of the drilling fluid or mud are to lubricate and cool the drill, to deposit solid or gelatinous matter on the walls of the hole thus preventing loss of fluid into the formations adjoining the well, and to carry up drill cuttings and sand to the surface of the well for removal. Another important function of the drilling fluid is to maintain a hydrostatic pressure on the lower portions of the well. The column of fluid exerts a pressure in the well corresponding to the density of the fluid and the height of the column. The pressure exerted by the column prevents escape of gas and oil into the well prior to completion of drilling operations.

All muds are heavier than water. Densities of typical drilling muds may be from about 9 to about 18 pounds per gallon or higher dependent upon whether the mud is unweighted or contains weighting agents such as silica, iron oxide, or barytes. Water has a density of about 8.3 pounds per gallon. In addition, a satisfactory drilling mud will generally have a viscosity of from about 5 to about 60 centipoises at 75° F. as measured by the Stormer viscosimeter at 600 r.p.m., or a viscosity of from about 29 seconds to about 100 seconds by the Marsh funnel method, 1500/946 at 70° F.

As wells are being drilled with increasing frequency to greater and greater depths, the selection and control of the physical and chemical properties of the drilling fluid have likewise become increasingly important. Because of the diverse functions which the drilling fluid must perform, the required physical and chemical properties are often incompatible or diametrically opposed. As a result, any commercially acceptable drilling fluid necessarily represents a compromise between the various required properties of the drilling fluid. For example, drilling fluid additives which may be used to impart improved properties to the fluid with respect to hole protection and pressure control are frequently detrimental to drilling rates. In fact, it is not at all uncommon to reduce the drilling rate by as much as 50% when adding to the drilling fluid materials which are needed to prevent caving or other hole troubles. It is believed by many experts in the art that the drilling fluid has more influence on drilling rate and footage per bit than any other single factor.

In attempting to develop drilling fluids representing the best compromises with respect to cost, performance characteristics, and particular drilling conditions, four major classes of drilling fluids have evolved, namely, water-base drilling fluids, oil-base drilling fluids, water-in-oil emulsion drilling fluids, and oil-in-water emulsion drilling fluids. An oil-in-water emulsion drilling fluid is distinguished from the other classes of drilling fluids in that it comprises a continuous aqueous phase in which an oil phase is dispersed. While some water-base drilling fluids may contain relatively minor amounts of dispersed liquid phase, oil-in-water emulsion drilling fluids are recognized by those skilled in the art as distinguished from such water-base drilling fluids by the fact that oil-in-water emulsion drilling fluids contain substantially larger proportions of a dispersed or emulsified liquid phase, usually about 5 percent or more of the total drilling fluid.

The instant invention relates to improved oil-in-water emulsion drilling fluids for use with rotary drilling equipment. As hereinafter described in detail, these drilling fluids are exceptionally useful in that they have made possible high drilling rates with remarkably good bit life while at the same time affording fluid properties approaching those of water yet giving wall building properties and carrying capacity for cuttings not attainable with water alone.

It is recognized that there have been many suggestions advanced in the prior art with respect to the use of various oil-in-water emulsions in rotary drilling. However, for the most part the oil-in-water emulsion drilling fluids heretofore proposed are more accurately described as emulsion muds in that they rely to a large extent on the physical emulsifying effect of a macroscopic material present as an extra or third phase, e.g., finely divided solid particles such as clay, starch, gum, etc. In some cases, the utility of certain specific types of chemical emulsifying agents in the emulsion muds has also been recognized. Although such emulsion muds may have a limited degree of utility under some circumstances, nevertheless, none of the so-called emulsion drilling fluids previously devised have achieved widespread commercial acceptance either because of their high cost or because of the limited conditions under which they can be used. For example, certain of the emulsion fluids suggested in the prior art are useful only in salt water systems; others require strictly fresh water; some have undesirable hydrating effects on shale and other producing formations; still others require the addition of costly weighting agents when increased fluid density is needed; etc.

The present invention is based on the discovery that certain non-ionic surface active or emulsifying agents comprising polyoxyalkylene compounds, particularly ethers, can be employed to form a relatively inexpensive and highly stable oil-in-water emulsion which does not require the presence of clays or other colloidal solids for emulsion stability and which possesses vastly superior properties and a wide degree of utility as compared with the emulsion drilling fluids heretofore known. The emulsion is formulated from either fresh or salt water which comprises the continuous phase and a suitable hydrocarbon oil as the disperse phase together with a small percentage of the selected non-ionic emulsifier on the order of from 0.05% to 1% by weight and generally from about 0.1% to about 0.5% by weight.

The non-ionic emulsifying agents used in the present invention comprise surface tension-reducing polyoxyalkylene compounds, preferably the water soluble to readily water dispersible polyoxyethylene ethers of partial esters of low molecular weight polyhydroxylic compounds and higher fatty or resin acids. By "low molecular weight polyhydroxylic compounds" is meant to include compounds of carbon, hydrogen and oxygen having two or more hydroxyl groups and whose molecular weight is not greater than those of the oligosaccharides. Preferred compounds of this class are the polyhydric alcohols such as ethylene glycol, glycerol, and pentaerythritol; the hexitols, such as mannitol and sorbitol; the internal ethers of polyhydric alcohols, such as hexitans, for example, mannitan and sorbitan, and hexides, for example, mannide and sorbide; and the external ethers of the polyhydric alcohols, such as the polyglycerols and dipentaerythritol. Of the preferred group the hexitans have been found best. In addition to these preferred polyhydroxylic compounds, other compounds of the broad group can be used including the sugars, such as glucose and sucrose, the cyclitols, such as inositol, and others which will be apparent. As the acid, higher carboxylic acids derived by saponification of natural fats, oils and waxes, the wood resin acids, and tall oil are suitable. These may be characterized as monocarboxylic organic acids containing from 12 to 22 carbon atoms.

The polyoxyethylene ethers employed in the invention are preferably ethers of partial esters, i.e., the carboxylic acid group should be attached directly to the polyhydroxylic compound and the number of attached acid groups must be at least one less than the number of esterifiable hydroxyl groups of the polyhydroxylic compound. The partial esters themselves are either completely or virtually insoluble in water and are dispersible in water only with difficulty. However, by adding a sufficient number of oxyethylene groups to the unesterified hydroxyl groups of the partial esters, the resulting ethers become water soluble or readily water dispersible as desired. The number of oxyethylene groups required to produce an ether of given solubility or dispersibility in water depends on the lipophilic character and number of the carboxylic acid radicals in the partial ester. Thus, a stearate requires more oxyethylene groups than a laurate, and a diester more than a monoester. At least 4 oxyethylene groups per lipophilic group are generally required to produce the desired effect, this phenomenon being well known in the art of non-ionic surface active agents. For example, see "Surface Active Agents," by Schwartz and Perry, pages 202 and 209, and U.S. Patent No. 2,422,145 to Walter A. Taylor. For most satisfactory results the polyoxyethylene ether should have from 6 to 60 oxyethylene groups per mol and preferably from about 10 to about 20 oxyethylene groups per mol.

The preferred emulsifying agents of the above class are: 16 polyoxyethylene sorbitan mono-tall oil ester (the number in this and other compounds named referring to the average number of oxyethylene radicals combined with each mol of the ester); 10 polyoxyethylene sorbitan monolaurate; 20 polyoxyethylene sorbitan dioleate; 18 polyoxyethylene glycerol monostearate; 8 polyoxyethylene propylene glycol monolaurate; 16 polyoxyethylene pentaerythritol mono-tall oil ester; 10 polyoxyethylene sucrose monooleate; and 6 polyoxyethylene diglycerol monolaurate. In particular, the 10 polyoxyethylene sorbitan monolaurate has been found to be especially effective. Commercial products corresponding to these descriptions are normally mixtures of related ether-esters because the acids employed are usually commercially available grades which are mixtures and the processes of manufacture involve competing reactions among several reactive hydroxyl groups. These mixtures are more efficient emulsifying agents, in general, than any single chemical individual in the mixture.

It has been found particularly advantageous in most cases to add to the non-ionic surface active emulsifier of the above-described class a minor proportion of an anionic oil-in-water emulsifier. The mixture of non-ionic and anionic emulsifiers results not only in improved emulsion characteristics under certain conditions but, more importantly, the mixed emulsifier has been found to impart to the drilling bit and drill pipe increased protection against corrosion, as hereinafter described in more detail. Examples of anionic emulsifiers that can be used are the long chain alkyl sulfates, sulfated triglycerides, dialkyl sulfosuccinates, and alkyl aryl sulfonates, preferably in the form of their sodium, calcium, lithium, or other alkali or alkaline earth metal salts, or their ammonium or organic nitrogen base salts. The amine salts of alkyl aryl sulfonates are preferred members of this class. Of the preferred group of anionic emulsifiers, the isopropyl amine salt of dodecyl benzene sulfonic acid has been found to be particularly effective, especially when used in admixture with 16 polyoxyethylene sorbitan mono-tall oil ester as the non-ionic surface active emulsifier. Obviously, the mixture of non-ionic and anionic emulsifiers is most suitable in cases where the aqueous phase of the emulsion comprises water of moderate or relatively low salt concentration. Likewise, when the available water for formulating the drilling fluid is highly saline or where the addition of salts to the emulsion becomes desirable for various reasons, a non-ionic emulsifier alone may be used to best advantage. However, a unique advantage of the herein disclosed class of non-ionic emulsifying agents is their apparent protective action when used in conjunction with an anionic emulsifying agent in saline water. In other words, when necessary the mixed non-ionic and anionic emulsifiers can be used effectively even in salt water, and the expected adverse effect of the salt water on the anionic compound is to some extent counteracted or prevented by the presence of the non-ionic agent.

The oils that can be used in the practice of the invention are hydrocarbon oils such as crude oil, topped crude oil, and various petroleum fractions such as kerosene, diesel oil, gas oil, heavy fuel oil, etc. Topped crude oil and the heavier petroleum fractions, such as the diesel oil fractions and heavier, are generally employed in making up the emulsion drilling fluids of the invention. Such oils may be present in amounts of from about 2% to about 10% by weight, and ordinarily about 5% oil in the emulsion is entirely satisfactory. The emulsion is most conveniently prepared by adding the relatively small amount of emulsifying agent to the oil and this mixture is then added to the water, but any other convenient order of mixing the materials may be used. Also, since the amount of emulsifying agent used is always rather small, it is often desirable to provide the emulsifier in the form of a solution in a suitable diluent such as benzene, kerosene, or a hydrocarbon oil of the type used in formulating the emulsion. In this way a more convenient volume of emulsifier additive is available for preparation of the emulsion fluid at the drilling site. After being mixed together, the emulsion ingredients are then pumped downwardly through the drill pipe to the bit in the usual manner and returned through the annulus to the settling and recirculation pits. The normal mechanical agitation incident to the pumping and recirculation of the fluid is entirely adequate to effect emulsification of the ingredients to form a highly stable oil-in-water emulsion. As the volume of the system increases with increasing hole depth, make-up emulsion may be added as required.

Although the so-called drilling muds are the most widely used drilling fluids, straight water as the drilling fluid is theoretically quite desirable and is often used. However, as a practical matter the use of water alone as the drilling fluid introduces many problems familiar to those skilled in the art. For example, many waters available in the oil fields are highly corrosive and water alone has a relatively high friction factor or low lubrication value thereby causing high torque on the drilling pipe. As a result, water drilling is hard on the drilling equipment, particularly the bits, the pumps, and the swivels. In addition, certain shales and other producing formations are prone to undergo hydration and sloughing when contacted with water alone so that at best water drilling has somewhat limited utility. Furthermore, with water alone as the drilling fluid abrasive particles from the drill cuttings tend to be recirculated thereby causing excessive bearing wear and decreasing the life of the bit.

The emulsion drilling fluid of the present invention offers many of the advantages of straight water drilling but without the aforementioned disadvantages.

One of the most outstanding advantageous properties of the present emulsion drilling fluid is its relatively low viscosity which is on the same order of magnitude as the viscosity of water even after extended use of the fluid in a drilling operation. Generally, the Marsh funnel viscosity will be not greater than about 29 seconds and the Stormer viscosity will be not greater than about 5 centipoises, except that in the case of salt waters these limits may be somewhat higher. In fact, using conventional field techniques for the measurement of viscosity, such as the Marsh funnel method, it is frequently possible to obtain apparent viscosity measurements less than the viscosity of water. As compared with water or a non-emulsion drilling fluid, the present drilling fluid exhibits a very pronounced and beneficial retardation in the build-up of Marsh funnel fluid viscosity with the result that the pump horsepower requirements to maintain a given circulation rate are substantially less than for other drilling fluids. The reduced friction encountered with the emulsion as compared with water also results in a minimum torque on the drill pipe which minimizes the horsepower requirements for driving the drill bit.

A further valuable benefit resulting from the drilling fluid of the present invention is the fact that the size of the cuttings or chips is markedly increased so that there is no substantial quantity of fines or finely powdered solid material produced during the drilling operation. The relatively large particle size of the cuttings obtained with the drilling emulsion of the present invention is a distinct advantage to the driller in that positive identification of the geological structure is greatly facilitated by examination of the cuttings. For example, in the Delaware basin of West Texas the presence of Lamar shale is a definite marker having important significance to the driller. Using water as the drilling fluid, this shale is hydrated and forms such fine particles that identification of the stratum from the cuttings is impossible. However, when the emulsion drilling fluid of the present invention is used, the Lamar shale stratum is easily recognized by the dark color of the larger size cuttings or chips.

Of equal importance with the low viscosity and the large size of the cuttings is the excellent drop-out characteristics of the present drilling fluid. Possibly as a result of the reduced surface tension, the cuttings and the clay or other solid particles originating from the formation during drilling are rapidly dropped out and deposited from the present drilling fluid to a remarkably effective degree when the effluent fluid from the well is flowed through the usual screens, settling pits, and the like. Thus, the fluid available for recirculation to the bit is substantially solids free and there is no appreciable problem of solids build-up in the recirculating fluid as is so frequently the case with many other types of drilling fluids.

Coincident with the valuable properties above described, and possibly as a result of these combined effects, the drilling fluid of the present invention makes possible a remarkably increased rate of penetration of the drilling bit. Comparative field tests repeatedly show faster penetration, increased footage, and fewer bits when the present emulsion drilling fluid is employed so that the ultimate economic benefits to the driller are self-evident. It is believed that the increased cuttings size and the more effective dropout of the cuttings, as described above, results in less regrinding of the cuttings to small particles which tend to pack in the well and slow down the rate of penetration of the bit.

In addition to the foregoing most significant benefits of the invention, there are many other advantages inherent in the present drilling fluid. For example, the class of polyoxyalkylene compounds comprising the principal emulsifying agents used in the invention are surface-tension reducing agents, as contrasted with colloidal type emulsifying agents such as starches and clays which tend to increase viscosity and horsepower requirements and to reduce circulating velocity. Moreover, the compounds are non-ionic so that the invention is applicable to both fresh and saline waters. This is true even though the polyoxyethylene ether compounds are used in admixture with an anionic agent because of the apparent protective effect of the non-ionic compound on the anionic agent, as described above. It is not uncommon in certain areas to find that the only available water contains as much as 3000 to 4000 p.p.m. of sodium chloride and as high as 4000 to 6000 p.p.m. of calcium and magnesium sulfates. However, such highly saline waters can be tolerated without any adverse effect as far as the present oil-in-water emulsion is concerned. Because of the fact that dissolved salts have no detrimental effects on the emulsion of the present invention, it is, therefore, possible to add salts or brine to the emulsion intentionally when necessary in order to increase the density of the drilling fluid without resorting to the use of the conventional more expensive weighting agents such as iron oxide or barytes. Salts may also be added to the emulsion when desired in order to diminish foaming and to maintain the aqueous phase in salt saturated condition so as to reduce leaching of salt formations. The addition of materials such as lime can also be tolerated and is frequently useful in reducing corrosion and hydration of shales. Certain other types of emulsifiers previously proposed for use in drilling fluids, such as soaps, are not stable in the presence of calcium and magnesium salts. Moreover, the present emulsifying agents are stable at the relatively high pressures and elevated temperatures (e.g. on the order of 200° F.) which frequently occur in an oil well. Obviously, for maximum emulsion stability it is important that the emulsifying agent be resistant to decomposition at the pressure and temperature conditions encountered in a drilling operation. Many other organic surface active agents are not stable at such severe conditions.

An unexpected benefit which has been realized with the emulsion drilling fluid of the present invention is the exceptional corrosion inhibiting effect of the emulsion which is responsible for a longer life for both the drill pipe and the drill bits, particularly the bearings of the bits. From an inspection of drill bits used in various formations with the present emulsion drilling fluid, it is believed that in some manner not entirely understood the combination of the emulsifying agent or agents and the oil phase of the emulsion results in a certain "plating out" or depositing of a highly stable oil film on the bit surface which imparts extremely good corrosion resistance. This effect is particularly noticeable when a mixture of non-ionic and anionic emulsifiers are used as previously described. Although the adverse effects of corrosion are recognized in many different ways, perhaps the most frequent difficulty encountered is failure of the drill bit bearings due to corrosion. Accelerated laboratory bearing tests under 16000 pounds load at 83 r.p.m. were made to compare the low solids or substantially solids-free emulsion drilling fluid of the present invention with a conventional high solids drilling mud. The failure of the bearing occurred in each case by spalling of the pin race. However, the bearing life while using the emulsion drilling fluid of the present invention was twice as great as the bearing life with the conventional mud.

As heretofore mentioned, some formations such as shale are subject to sloughing and other damage by hydration so that ordinary high water content drilling fluids are unsuited for use in such formations. However, the presence of the oil phase and the emulsifying agent of the present invention apparently results in a certain degree of preferential oil wetting which retards hydration of the susceptible formations so that damage to hydratable producing formations is held to a minimum by the use of the present emulsion fluid. Such preferential oil wetting of the cuttings and clay contributes to a low density mud of low solids content along with good drop-out characteristics and increased chip size. Moreover, the invention frequently eliminates the necessity for the use of various additives which are sometimes indicated in order to control fluid loss when drilling in a hydratable producing formation.

The present emulsion drilling fluid possesses under most conditions an adequate carrying capacity for cuttings without the necessity of loading the fluid with added materials. Generally speaking, for purposes of the present invention it is desired that the density of the emulsion drilling fluid be maintained at not greater than about 9 pounds per gallon at most and usually not more than about 8.3 to 8.5 pounds per gallon. However, if drilling conditions are encountered which make it necessary to increase the carrying capacity of the fluid, relatively inexpensive brine or other salts can be added which do not greatly increase the density of the fluid, and as a last resort the ordinary clays or barytes or the like can be added to the fluid being recirculated to the drill pipe to obtain an emulsion mud which is entirely effective and useful but which, according to the principles of the present invention, is not as desirable as a substantially solids-free emulsion drilling fluid. If such clays are added the resultant mud retains a relatively low viscosity in spite of the increased density.

Inasmuch as the amount of oil required is only on the order of 2 to 10% by weight of the emulsion, the present emulsion drilling fluid is highly economical as compared with ceratin high oil content emulsions previously proposed in the art. Moreover, the use of the present class of non-ionic emulsifying agents makes it unnecessary to utilize colloidal clay solids or other macroscopic particles for their emulsifying effect. On the contrary, emulsification in the present invention is obtained entirely by the surface active properties of the specified class of emulsifying agents which result in materially reduced surface tension. Of course, during the drilling operation in the hole the emulsion fluid will tend to pick up a certain amount of solid particles or clay solids dependent upon the nature of the formation. However, because of the greatly reduced tendency toward the production of fines by regrinding of the initial cuttings and because of the excellent drop-out characteristics of the fluid, as discussed above, the cuttings and any clay solids originating in the hole and present in the effluent fluid from the well are dropped out or settled in the mud pits so that a substantially solids free emulsion is available for return to the drill pipe and drill bit. In addition, these particular emulsifying agents have been found to produce the desired stable emulsion without excessive foaming or at least with good foam breakage during the recirculation of the fluid. Because of the relatively fast settling rate of the cuttings which is realized with the present emulsion drilling fluid, it is possible to obtain a very definite improvement in the life of the pump liner and pistons of the recirculating pump. From an overall viewpoint, the extreme simplicity of the present emulsion drilling fluid system results in an absolute minimum of service requirements in the field.

In addition to all of the foregoing advantages and desirable properties of the emulsion drilling fluid herein described, there is still another highly important quality of the drilling fluid which may very well assume increasing importance in the drilling art. Proposals have been made to inject air under pressure into a drilling fluid prior to entry of the recirculated fluid into the drill pipe stem. The resultant aerated drilling fluid is believed by many to give important benefits in the drilling operation. For example, when the aerated drilling fluid is returned through the annulus between the drill pipe and the hole wall, there is a beneficial increase in the fluid velocity as well as a marked reduction in the static head by reason of the expansion of the fluid under reduced pressure and ultimate release of the dissolved air. Furthermore, under appropriate conditions, aeration of the drilling fluid results in an increased rate of penetration and a significant reduction in the power requirements. Thus far, aeration tests have been confined largely to water drilling but the situation is immensely complicated by the fact that the combination of air and water usually produces an intolerable rate of corrosion. Consequently, even though aeration of drilling fluids is a highly desirable development from many viewpoints, nevertheless, the extreme corrosion problem has thus far seriously retarded the growth of this development. However, the excellent corrosion inhibiting properties of the emulsion drilling fluid of the present invention, particularly the mixed non-ionic and anionic emulsifiers herein described, make it possible to aerate the fluid quite effectively, e.g., with as much as 400 cubic feet of air per barrel, while at the same time avoiding serious corrosion difficulties. Thus, one of the most significant advantages of the present emulsion drilling fluid is the fact that it lends itself so readily to aeration without accompanying corrosion difficulties.

In order to illustrate the benefits of the invention more specifically, the results of four comparative field tests will now be presented by way of example but not for purposes of limitation. Examples A and B represent the data from two wells drilled in Hockley County, Tex., and Examples C and D are based on wells which were drilled in Gaines County, Tex., the comparisons in each instance being based on intervals drilled from the bottom of the casing to the first coring point. In each case conventional size 8¾ drilling bits were used with the weight on the bit ranging from 50,000 lbs. to 75,000 lbs. and rotary speeds of from 35 to 55 r.p.m. In the case of Examples A and C the drilling operation was initiated with water alone followed by the addition of clay at the 6000–7000 ft. level, whereas in Examples B and D the oil-in-water emulsion drilling fluid of the present invention was used. All tests were carried out at comparable pump delivery rates for the drilling fluid of from about 400 to about 450 gal./min. In each case the available water was saline with a sodium chloride content on the order of 2500 to 6000 p.p.m. and a hardness of about 350 p.p.m. of Ca and Mg salts. In the case of the drilling muds in Examples A and C, a conventional bentonite clay was used together with carboxymethyl cellulose as an additive. In Examples B and D the emulsion drilling fluids contained water and 5–6% of diesel or crude oil together with a few tenths of a percent of a mixture of 70% of 16 polyoxyethylene sorbitan mono-tall oil ester and 30% of the isopropyl amine salt of dodecyl benzene sulfonic acid. The pertinent data from the tests are summarized in Table I as follows:

Table I

| | A | B | C | D |
|---|---|---|---|---|
| Drilling fluid | Water with addition of clay at about 7300 ft. | Emulsion, 5-6% oil | Water with addition of clay at about 6300 ft. | Emulsion, 5-6% oil. |
| Density, lbs./gal | 8.6-9.3 | 8.3-8.4 | 8.5-9.3 | 8.3-8.5. |
| Marsh funnel viscosity, sec. | 33-46 | 27-29 | 32 increasing to 46. | 27-29. |
| Stormer viscosity, c.p.s. | 1.5-10 | 1.5-2 | 2-15 | 1.5-2. |
| Fluid loss (API), cc | 10-24 | 11-18 | 7-18 | 16-25. |
| Surface tension (du Nouy), dynes/cm. | 70+ | 41-45 | 70+ | 42-43. |
| Drilling interval, ft | 4,600-9,600 | 4,700-9,600 | 4,900-10,400 | 5,000-10,300. |
| Number of drill bits used. | 38 | 28 | 71 | 39. |
| Drilling time, hrs | 380 | 306 | 550 | 391. |
| Total estimated cost, dollars. | 31,000 | 23,500 | 53,500 | 34,100. |

From the foregoing test data it will be seen by comparing Example A with Example B and Example C with Example D that vastly superior results were obtained with the emulsion drilling fluid in each case. Thus, in Example B the number of bits required was reduced by about 26%, the drilling time was decreased by approximately 20%, and the total cost was decreased by about 24% as compared with Example A. Similarly, in Example D the number of bits was reduced by about 45% and the drilling time was reduced about 29% with a decrease in cost of about 36%, as compared with Example C.

In Examples A and B, cuttings samples were taken at 100-foot intervals between 5000 and 6400 feet so as to obtain a comparison between the cuttings size when drilling with water alone and with the emulsion of the present invention. In Example A with water as the drilling fluid the cuttings were invariably a finely ground powder, whereas in Example B the cuttings were many times larger and for the most part comprised chips of from ⅛ inch to ½ inch in size.

In still another test not shown in the above table, drilling was initiated with water as the drilling fluid, but at about 3780 feet oil and emulsifying agent were added of the same type described in connection with Examples B and D. Cuttings samples were examined at 10 foot intervals down to 3960 feet, and again there was a pronounced increase in the cuttings size from a fine powder immediately preceding the addition of the emulsion ingredients to relatively large cuttings at the lower depths predominating in chips of the ⅛ inch to ½ inch size. Also, there was a very marked decrease in torque and horsepower requirements almost immediately upon addition of the emulsion ingredients.

In Table II below the operating data are shown from two more field tests comparing a starch-containing emulsion fluid with an emulsion of the present invention containing a non-ionic emulsifier, namely, 10-polyoxyethylene sorbitan monolaurate. Both wells were drilled in the same formation in Terry County, Tex., under comparable conditions. In each case the weight on the bit was maintained at about 45,000 lbs. throughout most of the drilling period and the rotary speed was about 88 r.p.m. The pump delivery rate was approximately the same in both tests.

In Example E drilling was started with water alone and at about 5700 ft. a water-diesel oil mixture was substituted using starch as an emulsifier. In Example F a similar procedure was followed except that at about 5900 ft. a saturated salt water-diesel oil emulsion was introduced containing 10-polyoxyethylene sorbitan monolaurate as a non-ionic emulsifying agent.

Table II

| | E | F |
|---|---|---|
| Drilling fluid | Water with addition of 8-12% oil and starch emulsifier at about 5,700 ft. | Water with addition of 9-10% oil and non-ionic emulsifier at about 5,900 ft. |
| Density, lbs./gal | 10 | 9.8-10. |
| Marsh funnel, viscosity, sec | 39-46 | 38-43. |
| Stormer viscosity, cps | 7-15 | 5-12. |
| Fluid loss (API), cc | 4-8 | 2-6. |
| Depth of well, ft | 6,500 | 6,500. |
| Number of drill bits used | 4 size 12¼; 21 size 7⅞. | 3 size 12¼; 18 size 7⅞. |
| Drilling time, hrs | 274 | 227. |
| Total estimated cost, dollars | 19,200 | 16,300. |

As will be apparent from Table II, the number of bits required in Example F was reduced significantly. The drilling time was 17% less and the total cost was 15% less in Example F as compared with Example E.

Accordingly, it will be seen that the invention affords an exceedingly simple and widely usable emulsion drilling fluid which is highly economical and effective both for the operator of a well and the drilling contractor.

I claim:

1. In the method of drilling through a subsurface formation wherein a drilling fluid is continuously circulated through a drill pipe and drilling bit, the improvement which comprises passing to the drilling bit a substantially solids-free oil-in-water emulsion drilling fluid including a continuous phase comprising an aqueous liquid, a disperse phase comprising a hydrocarbon oil, and a minor amount of a non-ionic emulsifying agent comprising a surface-tension-reducing polyoxyalkylene compound.

2. The method of claim 1 further characterized by the step of introducing air under pressure into said fluid prior to passage thereof to the drilling bit whereby to provide an aerated drilling fluid, said non-ionic emulsifying agent also functioning to protect the drill pipe and bit against corrosion.

3. The method of claim 1 further characterized in that said emulsion drilling fluid also contains a minor amount, with respect to the non-ionic emulsifying agent, of an anionic emulsifier selected from the group consisting of the long chain alkyl sulfates, sulfated triglycerides, dialkyl sulfosuccinates, and alkyl sulfonates.

4. The method of claim 3 further characterized by the step of introducing air under pressure into said fluid prior to passage thereof to the drilling bit whereby to provide an aerated drilling fluid, the combination of said non-ionic and anionic emulsifying agents also functioning to protect the drill pipe and bit against corrosion.

5. In the method of drilling through a subsurface formation wherein a drilling fluid is continuously circulated through a drill pipe and drilling bit, the improvement which comprises passing to the drilling bit a substantially solids-free oil-in-water emulsion drilling fluid including a continuous phase comprising an aqueous liquid, a disperse phase comprising a hydrocarbon oil, and a minor amount of a non-ionic emulsifying agent comprising a polyoxyethylene ether of a partial ester of a low molecular weight polyhydroxylic compound and a higher carboxylic acid.

6. The method of claim 5 further characterized in that said polyhydroxylic compound is selected from the group consisting of the polyhydric alcohols, the internal and external ethers of polyhydric alcohols, and the sugars.

7. The method of claim 5 further characterized in that said polyhydroxylic compound comprises a hexitan.

8. The method of claim 5 further characterized in that said acid comprises a monocarboxylic acid having from 12 to 22 carbon atoms.

9. The method of claim 5 further characterized in that said polyoxyethylene ether contains from 6 to 60 oxyethylene groups per mol.

10. The method of claim 5 further characterized in that said polyoxyethylene ether contains from 10 to 20 oxyethylene groups per mol.

11. The method of claim 5 further characterized in that said polyoxyethylene ether comprises 10 polyoxyethylene sorbitan monolaurate.

12. The method of claim 5 further characterized in that said emulsion drilling fluid also contains a minor amount, with respect to the non-ionic emulsifying agent, of an anionic emulsifier selected from the group consisting of the long chain alkyl sulfates, sulfated triglycerides, dialkyl sulfosuccinates, and alkyl aryl sulfonates.

13. The method of claim 5 further characterized in that said emulsion drilling fluid also contains a minor amount, with respect to the non-ionic emulsifying agent, of an anionic emulsifier comprising an amine salt of an alkyl aryl sulfonate.

14. The method of claim 5 further characterized in that said non-ionic emulsifying agent comprises 16 polyoxyethylene sorbitan mono-tall oil ester, and said fluid also contains a minor amount, with respect to the non-ionic emulsifying agent, of an anionic emulsifying agent comprising the isopropyl amine salt of dodecyl benzene sulfonic acid.

15. The method of claim 14 further characterized in that the total emulsifying agent used comprises about 70% of said non-ionic agent and about 30% of said anionic agent.

References Cited in the file of this patent
UNITED STATES PATENTS

| | | |
|---|---|---|
| 2,423,144 | Gregg | July 1, 1947 |
| 2,555,794 | Henkes | June 5, 1951 |
| 2,583,399 | Wachter et al. | Jan. 22, 1952 |
| 2,671,757 | Wisherd | Mar. 9, 1954 |
| 2,689,219 | Menual | Sept. 14, 1954 |
| 2,696,453 | Sanders et al. | Dec. 7, 1954 |
| 2,698,833 | Wilson | Jan. 4, 1955 |
| 2,713,032 | Tailleur | July 12, 1955 |
| 2,799,649 | Caldwell et al. | July 16, 1957 |

OTHER REFERENCES

Atlas Surface Active Agents, publication by Atlas Powder Co. of Wilmington, Del., 1948, pages 38 and 40.

Atlas Surface Active Agents, publication by Atlas Powder Co. of Wilmington, Del., 1950, pages 24 and 25.

Principles of Drilling Mud Control, Tenth ed., Pub. by Petroleum Extension Service, Dallas, Tex., 1955, page 51.